(12) United States Patent
Vorpahl

(10) Patent No.: US 6,234,057 B1
(45) Date of Patent: May 22, 2001

(54) CABLE CUTTER

(76) Inventor: Carl H. Vorpahl, 2403 S. Palmetto Ave., Sanford, FL (US) 32771

( * ) Notice: Subject to any disclaimer, the term of this patent is extended or adjusted under 35 U.S.C. 154(b) by 0 days.

(21) Appl. No.: 09/464,911

(22) Filed: Dec. 16, 1999

(51) Int. Cl.[7] ............... B26D 3/16; B26D 11/00
(52) U.S. Cl. ............... 83/454; 83/862; 83/471.2; 83/477.1; 83/490; 83/564; 83/597; 30/90.6
(58) Field of Search .............. 83/862–864, 876, 83/884, 452–454, 471.2, 477.1, 477.2, 490, 564, 597, 663, 666; 30/90.6, 166.3, 90.3

(56) References Cited

U.S. PATENT DOCUMENTS

| 967,635 | 8/1910 | Hewitt . |
| 2,396,442 | 3/1946 | Shaver et al. . |
| 2,674,027 | * 4/1954 | Kosinski ............... 30/90.3 X |
| 3,057,240 | * 10/1962 | De Witt ............... 83/490 X |
| 3,916,763 | * 11/1975 | Maroschak ............... 83/490 X |
| 4,567,795 | * 2/1986 | Pool ............... 83/490 X |
| 4,640,007 | * 2/1987 | Hydorn ............... 83/490 X |
| 4,709,610 | 12/1987 | Pool . |
| 4,753,144 | * 6/1988 | May ............... 83/471.2 X |
| 5,109,899 | * 5/1992 | Henderickson ............... 83/471.2 X |
| 5,176,060 | * 1/1993 | Thornton ............... 83/471.2 |

* cited by examiner

Primary Examiner—Boyer Ashley
(74) Attorney, Agent, or Firm—Stephen R. Greiner

(57) ABSTRACT

A product for cutting cables with spiral-wound, metallic casings. The product includes a frame having a base portion and a carriage portion pivotally attached to the base portion. The base portion has a receptacle for supporting a cable to be cut. A pair of rip saws are mounted on the carriage portion. Each of the rip saws has a rotating blade positioned for engagement with a cable in the receptacle at an orientation parallel to the longitudinal axis of the receptacle. A crosscut saw is mounted on the carriage portion between the rip saws. The crosscut saw also has a rotating blade positioned for engagement with a cable in the receptacle. This latter blade is oriented perpendicular to the longitudinal axis of the receptacle. In use, the carriage portion is manually pivoted toward the base portion to simultaneously engage the blades of the rip and crosscut saws with a cable in the receptacle.

9 Claims, 3 Drawing Sheets

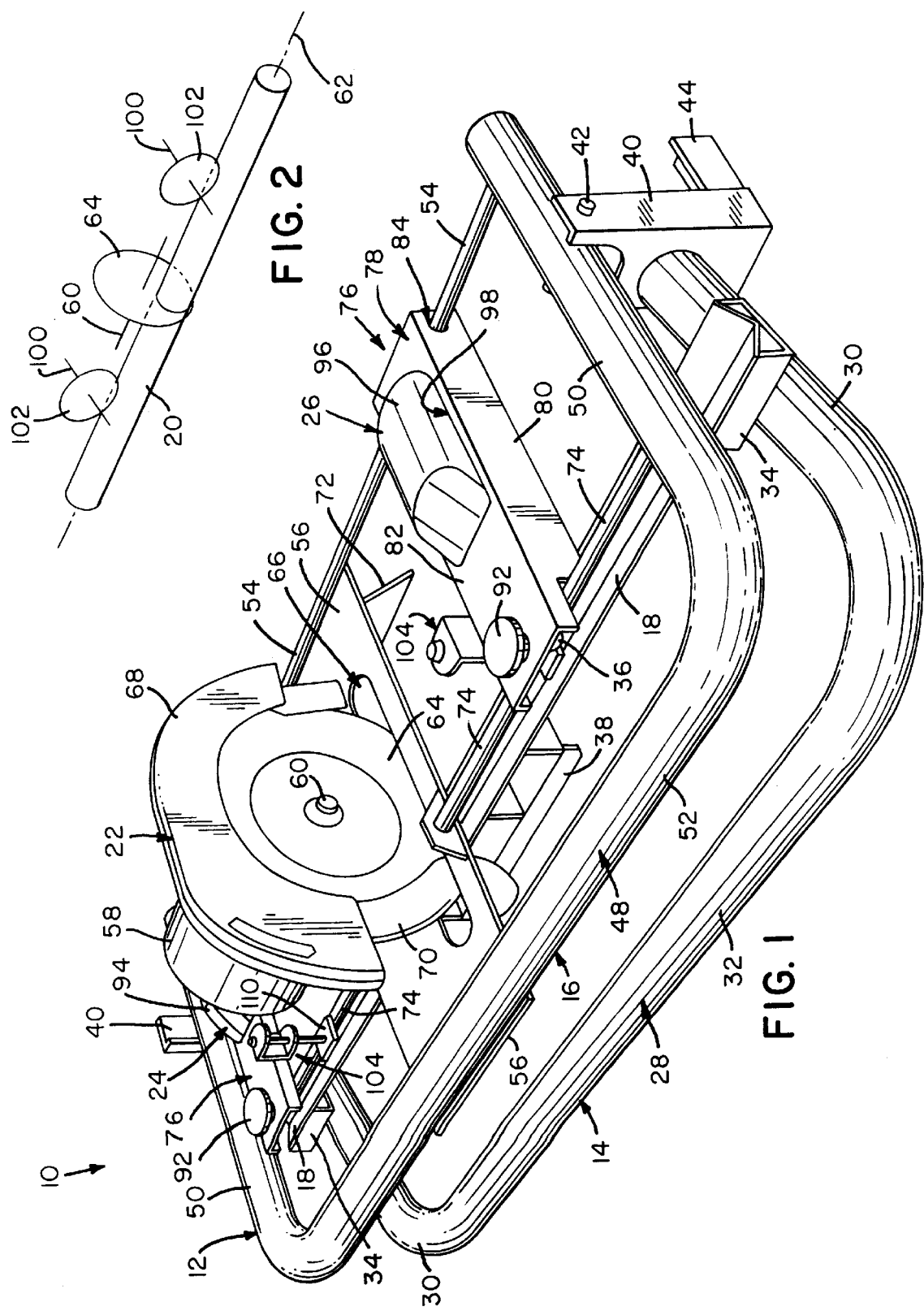

CABLE CUTTER

FIELD OF THE INVENTION

The present invention relates generally to cutting apparatus and, in particular to cutters having plural, independent, rotary blades.

BACKGROUND OF THE INVENTION

Electrical cables with spiral-wound, metal casings have always been difficult to prepare for use. As is well known, simply bisecting such a cable at any point, leaves the electrical leads of the cable inaccessibly positioned within the casing. Thus, a portion of the casing, perhaps a foot-long piece, must usually be removed from the end of a cable to permit access to the adjacent leads. To remove a portion of the casing, the cable is doubled back upon itself and the casing is cut with a hacksaw. Not only is the process time-consuming, but it is prone to cause damage to both the skin of an electrician's hands as well as exposed leads when the hacksaw blade slips from its intended path.

SUMMARY OF THE INVENTION

In light of the problems associated with the known methods and apparatus for cutting electrical cables with spiral-wound, metal casings, it is a principal object of the invention to provide a cable cutter that will make three, simultaneous cuts to a cable. One cut is oriented at right angles to the longitudinal axis of the cable and bisects the cable. The other two cuts are shallow, positioned on opposite sides of the first cut, and is oriented parallel to the longitudinal axis of the cable to cut its casing only.

It is another object of the invention to provide a cable cutter of the type described which will accommodate cables of varied length and diameter.

It is a further object of the present invention to provide a cable cutter which may be operated by a single user without special tools or training so as to cut numerous cables with great speed, ease, and precision.

It is an object of the invention to provide improved elements and arrangements thereof in a cable cutter for the purposes described which is lightweight in construction, inexpensive to manufacture, and dependable in use.

Briefly, the cable cutter in accordance with this invention achieves the intended objects by featuring a frame having a base portion with a cable-supporting receptacle and a pivotally-attached, carriage portion. A pair of rip saws are mounted on the carriage portion. Each of the rip saws has a rotating blade for engagement with a cable in the receptacle at an orientation parallel to the longitudinal axis of the cable and receptacle. A crosscut saw is mounted on the carriage portion between the rip saws. The crosscut saw also has a rotating blade for cutting a cable in the receptacle. This latter blade is oriented perpendicular to the longitudinal axis of the cable and receptacle.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of a cable cutter in accordance with the present invention.

FIG. 2 is a diagrammatic view of the cable cutter of FIG. 1 showing engagement of the rotary cutting blades with a cable.

Similar reference characters denote corresponding features consistently throughout the accompanying drawings.

DETAILED DESCRIPTION OF THE PREFERRED EMBODIMENT

Figure 3:
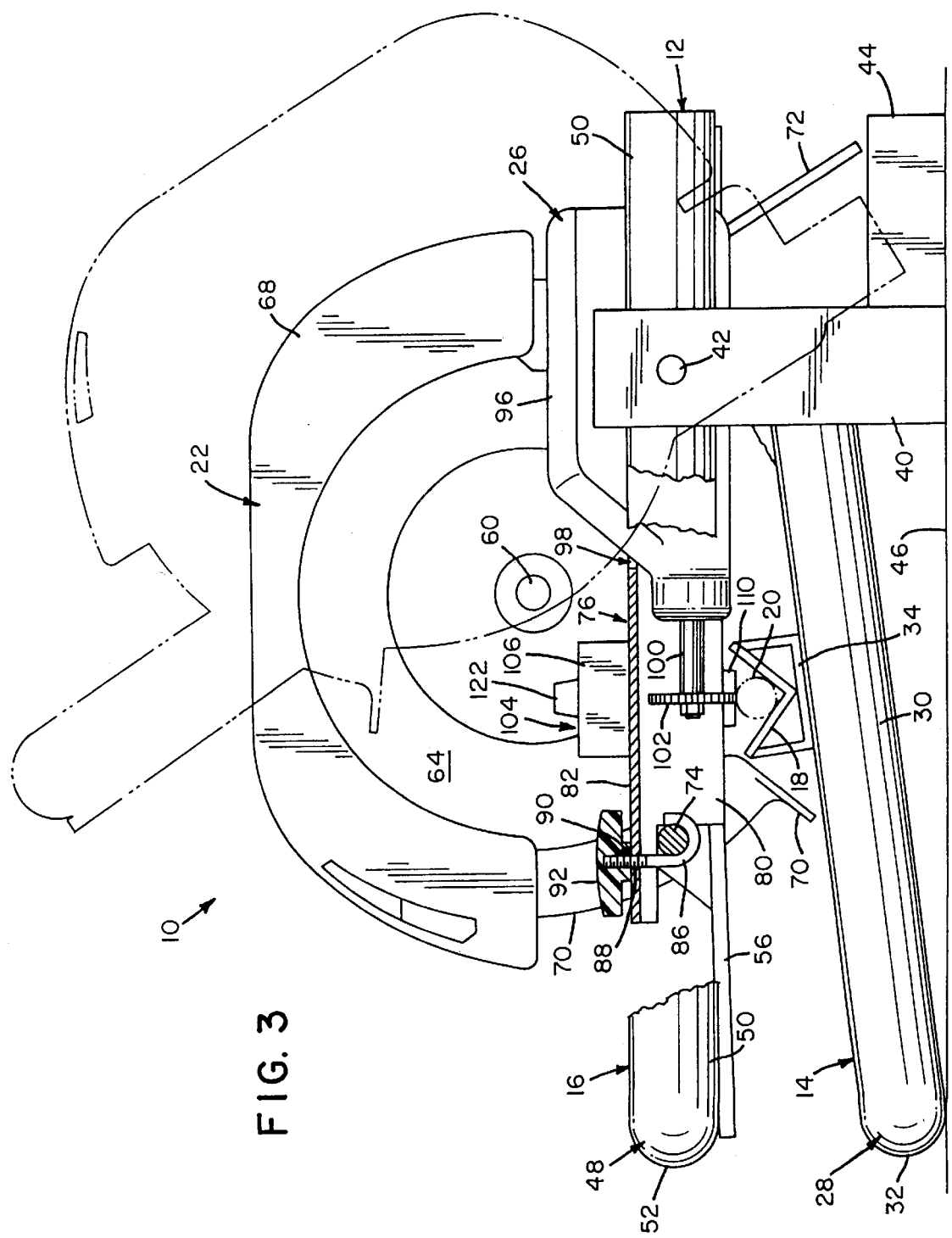
FIG. 3 is a right side view of the cable cutter.
Figure 4A:
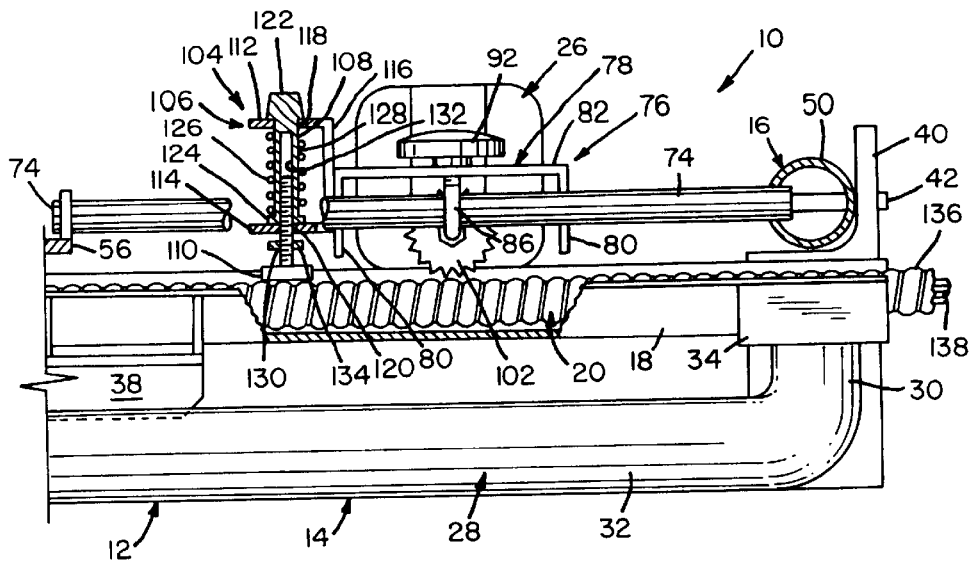
FIG. 4A is a front view of the right side of the cable cutter.
Figure 4B:
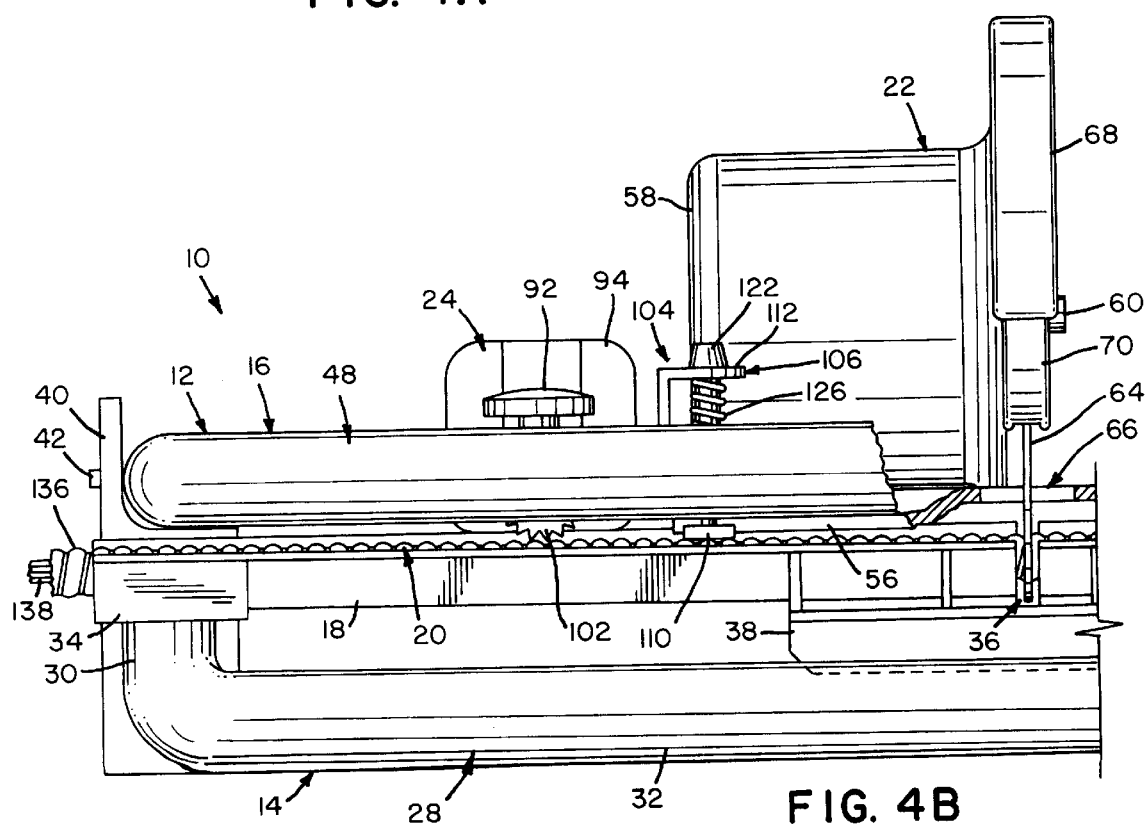
FIG. 4B is a front view of the left side of the cable cutter.

Referring now to the FIGS., a cable cutter in accordance with the present invention is shown at 10. Cable cutter 10 includes a frame 12 having a base portion 14 and a pivotally-attached carriage portion 16. Base portion 14 has an elongated receptacle 18 into which a length of cable 20 may positioned for cutting. Carriage portion 16, however, supports crosscut and rip saws 22, 24 and 26 for making lateral and longitudinal cuts of predetermined depths into cable 20. Saws 22, 24 and 26 engage cable 20 when carriage portion 16 is pivoted downwardly toward base portion 14 by a user.

Base portion 14 includes a U-shaped body 28 with a pair of opposed legs 30 connected by a cross member 32. U-shaped body 28 is preferably formed of lightweight, metallic tubing. As shown, legs 30 and cross member 32 are integrally joined together.

Receptacle 18 connects legs 30 at a set distance from cross member 32. Since receptacle 18 has a V-shaped cross-sectional configuration that holds cable 20 steady at its bottom regardless of diameter, U-shaped brackets 34 are provided at the opposed ends of receptacle 18 to reinforce its connection with legs 30. At its midpoint, receptacle 18 has a blade-receiving slot 36 which divides receptacle 18 in half. A brace assembly 38, positioned beneath slot 36, links the two halves together.

The midpoints of columns 40 are respectively secured to the ends of legs 30. The upper ends of columns 40 carry pins 42 upon which carriage portion 16 pivots. The lower ends of columns 40, however, carry brackets 44 which may be used in conjunction with threaded fasteners (not shown) to fasten cable cutter 10 to a horizontal, supporting surface 46.

Like base portion 14, carriage portion 16 includes a U-shaped body 48 formed of lightweight, metallic tubing. Preferably, U-shaped body 48 has a pair of opposed legs 50 integrally joined by a cross member 52. Legs 50 are connected near the center of balance of carriage portion 16 by pivot pins 42 to columns 40.

A guide rod 54 connects the rear ends of legs 50 together and supports the rear end of a carriage plate 56. Plate 56 extends forwardly from the center of rod 54 to cross member 52 and carries saw motor 58 upon its top surface. Motor 58 has a rotating shaft 60 oriented parallel to the longitudinal axis 62 of cable 20 when positioned in receptacle 18. An abrasive-type, circular, cutting blade 64 is fastened to shaft 60 for rotation in a plane oriented perpendicular to the longitudinal axis of cable 20 and receptacle 18. A cutout 66 in plate 56 permits the downward passage of blade 64 into slot 36 of receptacle 18.

Blade 64 is shielded to prevent injury from contact with it and flying cuttings from cable 20. As shown, a C-shaped shield 68 with retracting guard 70 is carried by motor 58 and positioned atop blade 64. Rearward of cutout 66, a shield 72 is secured to the bottom of plate 56 to deflect cuttings downwardly.

Plate 56 is steadied by a pair of axially-aligned, guide rods 74 which connect the opposite sides of plate 56 with legs 50.

A pair of slides 76 are movably positioned on rods 54 and 74 for carrying saws 24 and 26 on opposite sides of saw 22. Each slide 76 includes a channel member 78 having a pair of parallel, side walls 80 connected at their upper ends by a top wall 82. The rear ends of side walls 80 are provided with axially-aligned bores 84 for the passage of rod 54. Each top wall 82 projects forwardly from its associated side walls 80 and is adapted to rest upon a rod 74.

Each forwardly-projecting portion of top wall 82 carries a movable hook 86 for grasping a rod 74. The shank 88 of hook 86 passes through an opening 90 in a top wall 82 and is threaded to receive a knob 92 which may be rotated to raise or lower hook 86. Thus, by tightening knob 92, a channel member 78 can be selectively locked in position on a guide rod 74.

Saws 24 and 26 are carried by slides 76. Saw motors 94 and 96 are positioned between side walls 80 and extend above and below top walls 82 as permitted by top wall openings 98. Each of saw motors 94 and 96 has a rotating shaft 100 oriented perpendicular the longitudinal axis 62 of cable 20 in receptacle 18 so as to spin a toothed, circular blade 102 connected thereto in a plane oriented parallel to the longitudinal axis of cable 20 in receptacle 18.

Motors 94 and 96 are electrically powered and are energized by connection to a remote power source such as a conventional wall outlet (not shown). Preferably, motors 58, 94 and 96 are wired so that they are energized to simultaneously rotate blades 64 and 100 when connected to the power source. Of course, any desired means may be utilized to power motors 58, 94 and 96.

To hold cable 20 snugly within receptacle 18 while blades 64 and 102 engage it, slides 76 are each fitted with a cable clamp 104. Each cable clamp 104 includes a U-shaped bracket 106 carrying a spring-biased post 108. Post 108 has a foot 110 at its lower end which may be brought into snug engagement with cable 20 simply by rotating carriage portion 16 downwardly.

Bracket 106 has a top leg 112 connected to a bottom leg 114 by a cross piece 116. Cross piece 116 is secured to a side wall 80 of a channel member 78. Legs 112 and 114 are provided with axially-aligned apertures 118 and 120 which slidably receive post 108.

Post 108 is provided with an enlarged head 122 at its upper end for positioning above leg 112 and an enlarged foot 110 at its lower end for positioning below leg 114. Between head 122 and foot 110, post 108 has an enlarged shoulder 124 urged normally by a compressed spring 126 into engagement with the top of leg 114 thereby retaining foot 110 at the lower limit of its travel.

So that foot 110 may be made to clamp cables of different diameter within receptacle, post 108 includes female and male members 128 and 130 which may be made to telescope from one another. As shown, female member 128 has head 122, shoulder 124 and an internally-threaded, vertically-disposed bore 132. Male member 130, on the other hand, comprises a threaded rod adapted for positioning in bore 132 and for threaded engagement with female member 128. Male member 130 carries foot 110 at its lower end. A nut 134 on member 130 above foot 110 sets the upper limit of travel of foot 110 by engaging the bottom of leg 114.

Use of cable cutter 10 is straightforward. First, cable 20 is positioned in receptacle 18 so that the point where it is to be parted is located above slot 36. Next, with carriage portion 16 in a raised position, saw motors 58, 94 and 96 are energized by connecting such to an electrical current source. Carriage portion 16 is, then, pivoted downwardly from the broken line position to the solid line position of FIG. 2 to bring rotating blades 64 and 102 into engagement with cable 20. Blade 64 cuts cable 20 into two, side-by-side segments whereas blades 102, being adjusted to just "kiss" cable 20, notches the cable's spiral-wound casing 136. The notches permit casing 136 to be parted so that a pair of casing segments located on opposite sides of the cut made by blade 64 may be removed to expose electrical leads 138 for use.

The length of the two, casing segments cut by blades 64 and 102 may be adjusted by moving slides 76 on rods 54 and 74. To move slides 76, knobs 92 are turned to release hooks 86 from rods 74. Next, slides 76 are moved to a selected distance from blade 64. By retightening knobs 92, the distance between blades 64 and 102 is set. The entire process of adjusting cable cutter 10 and making a cut requires, at most, a few minutes to accomplish. Thus, a user may make many cuts in a cable with a spiral wound casing throughout a workday with speed, ease, and precision.

While the invention has been described with a high degree of particularity, it will be appreciated by those skilled in the art that modifications may be made thereto. For example, it is contemplated that carriage portion 16 could be elevated without human intervention with the addition of powered, lifting means to frame 12. Therefore, it is to be understood that the present invention is not limited to the sole embodiment described above, but encompasses any and all embodiments within the scope of the following claims.

I claim:

1. A cable cutter, comprising:

a frame having a base portion and a carriage portion pivotally attached to said base portion, said base portion having a receptacle with a longitudinal axis for supporting a cable parallel to said longitudinal axis;

a pair of rip saws mounted on said carriage portion, each of said rip saws having a first rotating blade positioned for engagement with said cable in said receptacle, each said first rotating blade being oriented parallel to said longitudinal axis of said receptacle; and, a crosscut saw mounted on said carriage portion between said rip saws, said crosscut saw having a second rotating blade positioned for engagement with said cable in said receptacle, said second rotating blade being oriented perpendicular to said longitudinal axis of said receptacle.

2. A cable cutter, comprising:

a frame including:

a base portion for positioning upon a horizontal supporting surface, said base portion having:

a first U-shaped body with a pair of first opposed legs connected by a first cross member; and, a receptacle for supporting a cable, said receptacle having opposed ends connected to said first opposed legs, said receptacle also having a longitudinal axis parallel to which said receptacle supports said cable;

a carriage portion pivotally attached to said base portion, said carriage portion having:

a second U-shaped body with a pair of second opposed legs connected by a second cross member;

a first guide rod connecting said second opposed legs together;

a carriage plate connecting said first guide rod to said second cross member;

a pair of second guide rods positioned between said first guide rod and said second cross member, each of said second guide rods respectively connecting said carriage plate with one of said second opposed legs;

a pair of slides slidably positioned on said first and second guide rods, said slides each being positioned on opposite sides of said carriage plate;

a pair of rip saws each respectively mounted on one of said slides, each of said rip saws having a first rotating blade positioned for engagement with said cable in said receptacle, each said first rotating blade being oriented parallel to said longitudinal axis of said receptacle; and, a crosscut saw mounted on said carriage plate, said crosscut saw having a second rotating blade positioned for engagement with said cable in said receptacle, said second rotating blade being oriented perpendicular to said longitudinal axis of said receptacle.

3. The cable cutter according to claim 2 wherein said carriage portion further includes a pair of cable clamps each respectively secured to one of said slides for selectively pressing said cable downwardly into said receptacle.

4. The cable cutter according to claim 3 wherein each of said cable clamps includes:

a U-shaped bracket having a top leg connected to a bottom leg by a cross piece, said top and bottom legs being provided with axially-aligned apertures;

a post slidably received within said axially-aligned apertures, said post having:
an enlarged head positioned above said top leg and an enlarged foot positioned below said bottom leg; and,
an enlarged shoulder between said enlarged head and said enlarged foot; and, a compressed spring encircling said post and between said top leg and said enlarged shoulder for urging said enlarged shoulder into engagement with said bottom leg.

5. The cable cutter according to claim 4 wherein said post further includes:

a female member having an internally-threaded, vertically-disposed bore therein; and, an externally-threaded, male member adapted for positioning in said bore and for threaded engagement with said female member.

6. A cable cutter, comprising:

a frame including:
a base portion for positioning upon a horizontal supporting surface, said base portion having:
a first U-shaped body with a pair of first opposed legs connected by a first cross member;
a pair of columns each being respectively secured to one of said first opposed legs; and,
a receptacle having a V-shaped cross section for supporting a cable, said receptacle having opposed ends connected to said first opposed legs, said receptacle also having a longitudinal axis parallel to which said receptacle supports said cable;

a carriage portion pivotally attached to said columns of said base portion, said carriage portion having:
a second U-shaped body with a pair of second opposed legs connected by a second cross member;
a first guide rod connecting said second opposed legs together;
a carriage plate connecting said first guide rod to said second cross member;

a pair of second guide rods positioned between said first guide rod and said second cross member, each of said second guide rods respectively connecting said carriage plate with one of said second opposed legs;

a pair of slides being slidably positioned on said first and second guide rods, each of said slides being positioned on opposite sides of said carriage plate, each of said slides including:

a channel member having a front end and a rear end and a pair of axially-aligned apertures in said rear end for slidably receiving said first guide rod, said front end of said channel member being provided with an opening located above one of said second guide rods;

a hook engaging one of said second guide rods, said hook having a threaded shank extending upwardly through said opening in said front end of said channel member; and, a knob threadably fastened to said threaded shank for raising and lowering said hook to selectively clamp one of said second guide rods against said channel member;

a pair of rip saws each respectively mounted on one of said channel, each of said rip saws having a first rotating blade positioned for engagement with said cable in said receptacle, each said first rotating blade being oriented parallel to said longitudinal axis of said receptacle; and, a crosscut saw mounted on said carriage plate, said crosscut saw having a second rotating blade positioned for engagement with said cable in said receptacle, said second rotating blade being oriented perpendicular to said longitudinal axis of said receptacle.

7. The cable cutter according to claim 6 wherein said carriage portion further includes a pair of cable clamps each respectively secured to one of said slides for selectively pressing said cable downwardly into said receptacle.

8. The cable cutter according to claim 7 wherein each of said cable clamps includes:

a U-shaped bracket having a top leg connected to a bottom leg by a cross piece secured to one of said channel members, said top and bottom legs being provided with axially-aligned apertures;

a post slidably received within said axially-aligned apertures, said post having:
an enlarged head positioned above said top leg and an enlarged foot positioned below said bottom leg; and,
an enlarged shoulder between said enlarged head and said enlarged foot; and, a compressed spring encircling said post and between said top leg and said enlarged shoulder for urging said enlarged shoulder into engagement with said bottom leg.

9. The cable cutter according to claim 8 wherein said post further includes:

a female member having an internally-threaded, vertically-disposed bore therein; and, an externally-threaded, male member adapted for positioning in said bore and for threaded engagement with said female member.

* * * * *